No. 704,791. Patented July 15, 1902.
W. H. GLOSSER.
MARKER BAR FOR PLANTERS.
(Application filed May 2, 1902.)
(No Model.)
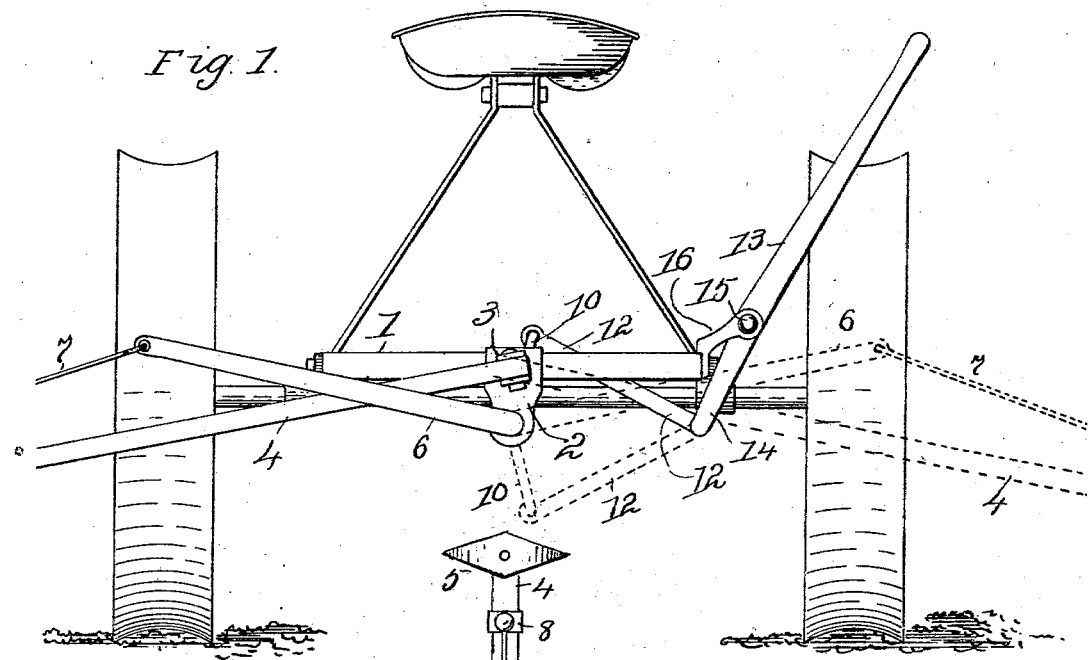
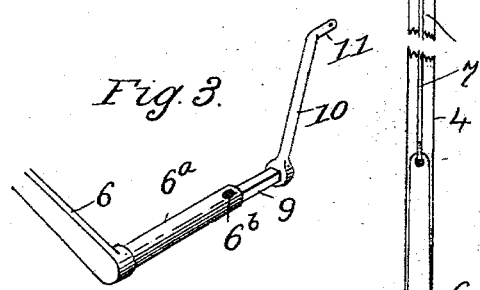
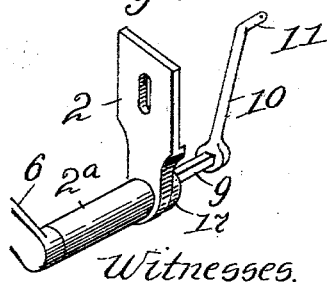
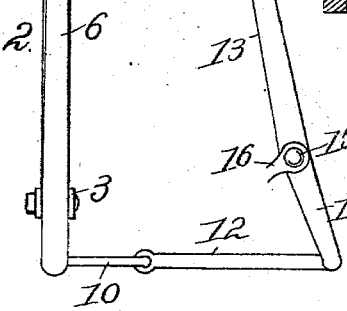
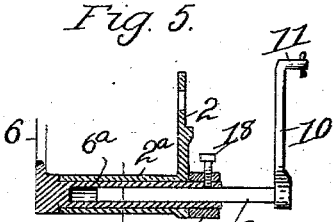
Witnesses.
Nora Graham
Ina Graham
Inventor,
William H. Glosser.
by S. R. Graham
his attorney.

ved by mail to s...

UNITED STATES PATENT OFFICE.

WILLIAM H. GLOSSER, OF FORSYTH, ILLINOIS, ASSIGNOR OF ONE-HALF TO GEORGE L. JONES, OF EMERY, ILLINOIS.

MARKER-BAR FOR PLANTERS.

SPECIFICATION forming part of Letters Patent No. 704,791, dated July 15, 1902.

Application filed May 2, 1902. Serial No. 105,702. (No model.)

*To all whom it may concern:*

Be it known that I, WILLIAM H. GLOSSER, of Forsyth, in the county of Macon and State of Illinois, have invented a certain new and useful Improvement in Marker-Bars for Planters, of which the following is a specification.

This invention refers to the marker-bars of corn-planters; and the object is to provide improved means whereby the marker may be raised from one position preparatory to turning around at the ends of the field and laid down on the opposite side of the planter after the turns are made.

In the drawings forming part of this specification, Figure 1 is a rear elevation of so much of a planter-frame as is needed to show the relation of my invention to the planter. Fig. 2 is a detail in rear elevation, showing the marker-bar raised. Fig. 3 is a detail in perspective of the lift-bar and the crank used to actuate the same. Fig. 4 is a detail in perspective of the lift-bar, the controlling-crank, and the bracket used to connect the appliance with the planter-frame. Fig. 5 is a longitudinal section through the sleeve of the attaching-bracket and through the hollow stem of the lift-bar. Fig. 6 is a cross-section on dotted line X in Fig. 5.

The rear cross-bar of a planter-frame is shown at 1 in Fig. 1.

At 2 is shown a bracket attached to the rear cross-bar of the planter-frame. A pivot-head for the check-row bar 4 is shown at 3, and such head is journaled in the bracket 2 and in the rear cross-bar of the planter-frame. The marker-bar 4 is provided with a marker 5 of any desired construction. The lift-bar 6 is journaled in a sleeve 2ª of bracket 2 below the pivot-head 3 of the marker-bar, and its extended end rises above the marker-bar when the marker-bar is lowered on either side of the planter, as shown in Fig. 1. A rod 7 connects the extended end of lift-bar 6 with a bearing 8, secured on the marker-bar, near the outer end thereof. The lift-bar 6 has a bearing-stem 6ª, which is recessed longitudinally, as shown in Fig. 5, and provided with a hole 6ᵇ in its inner end. The recess in the bearing-stem of the lift-bar is prismatic in cross-section, preferably square, and it is adapted to turn the square shaft 9 of crank 10 and permit such shaft to be adjusted lengthwise. The crank-shaft provides means through which the lift-bar 6 is shifted to raise and lower the marker-bar, and motion may be given to the crank by various mechanical devices. In this instance a lever 13 is fulcrumed at 15 on a bracket 16, secured to a side bar of the planter-frame, and a link 12 connects the cranked end 11 of crank-bar 10 with the lower end 14 of the lever.

With the particular shifting mechanism shown motion is transmitted to the crank-bar 10 through the lever by pulling the lever-handle toward the driver's seat. The crank-bar 10 extends upwardly when the marker rests on one side of the planter, and it extends downwardly when the marker rests on the other side of the planter. The lower end of the lever is in approximately horizontal alinement with the pivot of the lift-bar, and the angle formed by the link 12 with the crank-bar when the marker-bar is lowered is the same when the crank-bar extends downward as when it extends upward and is approximately a right angle. As the handle of the lever is drawn toward the seat the crank-bar swings upward or downward, as the case may be, and when the marker-bar is in a vertical position the crank is in alinement with the link 12, as shown in Fig. 2.

The marker-bar is given sufficient momentum in raising it to a vertical position to cause it to swing past the vertical, and after the vertical is past the marker may be held raised until the planter is in proper position and then lowered to a position on the side of the planter opposite that from which it was raised. Suitable means may be provided for holding the lever in the position shown in Fig. 2 or thereabout, and this feature is left to the choice of the user of the appliance.

The lift-bar 6 has its swinging end raised above the marker when the marker is lowered, and when motion is imparted to the lift-bar it is exerted through link 7 as an upward pull on the weighted end of the marker. As the marker-bar approaches the vertical the resistance of the weighted end thereof to upward motion becomes gradually less and in a corresponding ratio the slack in the lift-bar and link is taken up. The slack which gives the lift-bar its upward pull when the marker-bar is lowered results from the eccentricity of the pivots of the marker-bar and the lift-bar, respectively. The two pivots being in vertical alinement with the pivot of the lift-bar lower than the pivot of the marker-bar it is obvious that as the two bars travel upward the slack will be taken up to an extent equal to the distance of the two pivots and that the lift-bar and link will assume vertical positions when the marker-bar is vertical.

To enable the appliance to be used on planters of different construction, the shaft 9 of the controlling-link 10 is made longitudinally adjustable, so as to get the bearing end 11 in different positions forward and back with relation to the planter-frame and to the marker-bar. The bracket 2 has a sleeve $2^a$, in which the tubular stem $6^a$ of the lift-bar journals and through which it extends. The inner end of the stem $6^a$ has a hole $6^b$, as shown in Fig. 3, through which a set-screw may extend, and a collar 17 is set on the inner end of the stem back of the bracket and secured in place by a set-screw 18, which extends through hole $6^b$ of the stem and engages the shaft 9 of the crank-bar. The collar holds the stem in position on the sleeve of the bracket. The set-screw holds the collar in place and it also engages the shaft 9 and holds said shaft in whatever position it is required to assume.

The proportions and shape of the various parts may be varied to any extent consistent with the terms of the claims hereinafter made, and I do not restrict myself to the precise details herein shown and described.

I claim—

1. A marker-bar pivotally connected with a planter-frame, a lift-bar pivotally connected with the planter-frame at a point below the pivot of the marker-bar and a link extending from the swinging end of the lift-frame to the marker-bar at a point near the weighted end thereof, the lift-bar and the link being sufficiently long to compensate for the lower position of the pivot of the lift-bar, so that the lift-bar and link will line up with the marker-bar when the marker-bar is in a vertical position and the swinging end of the lift-bar will extend above the marker-bar when the marker-bar is lowered, substantially as described.

2. In a marker-bar-lifting appliance, the combination of a bracket attached to a planter-frame, a marker-bar pivotally connected with the bracket, a lift-bar having a tubular bearing-stem journaled in the bracket below the pivot of the marker-bar, a crank-bar extending into the tubular stem of the lift-bearing and adjustable lengthwise therein, means for rocking the crank to raise and lower the lift-bar and a link connecting the extended end of the lift-bar with the marker-bar, substantially as described.

3. In a marker-bar-lifting appliance, the combination of a bracket attached to a planter-frame and having a rearward extended sleeve, a lift-bar having a tubular bearing-stem extended through and beyond the sleeve of the bracket, a crank-bar extended into the tubular stem of the lift-bar, a collar fitting on that part of the stem that projects beyond the bracket and a set-screw extending through the collar and the stem into engagement with the crank, substantially as described.

4. In a lifting appliance for marker-bars, the combination of a bracket secured to a planter-frame, a marker-bar pivotally connected with the bracket, a lift-bar pivoted in the bracket below the pivot of the marker-bar, a link connecting the extended end of the lift-bar with the marker-bar, a crank connected with the lift-bar and extended at approximately right angles therewith, a lever fulcrumed to swing in a vertical plane toward and from the pivot of the lift-bar and a link connecting the lever with the crank of the lift-bar, substantially as described.

In testimony whereof I sign my name in the presence of two subscribing witnesses.

WILLIAM H. GLOSSER.

Witnesses:
W. J. DICKINSON,
GEO. L. JONES.